May 11, 1943.  W. G. SYPHER  2,318,977
MACHINE FOR INLAYING
Filed April 15, 1940  3 Sheets-Sheet 1

INVENTOR
Milford Guy Sypher
BY
Norman T. Holland
ATTORNEY

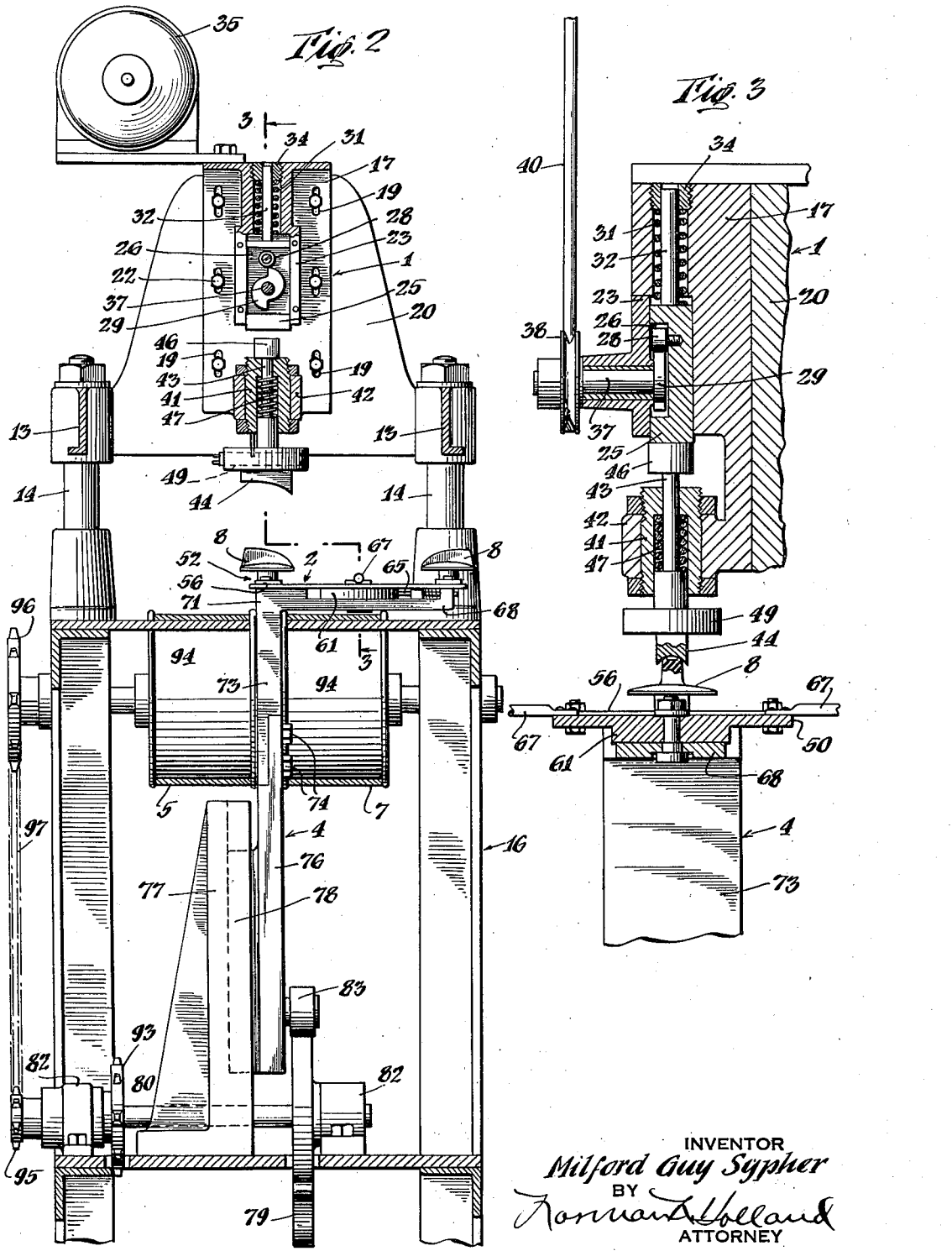

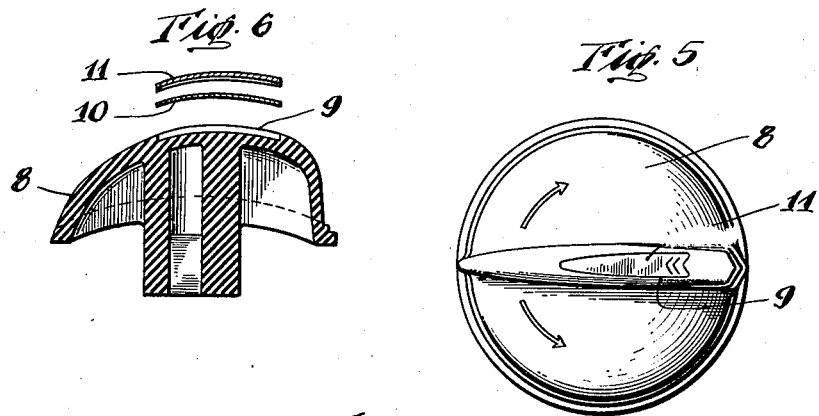
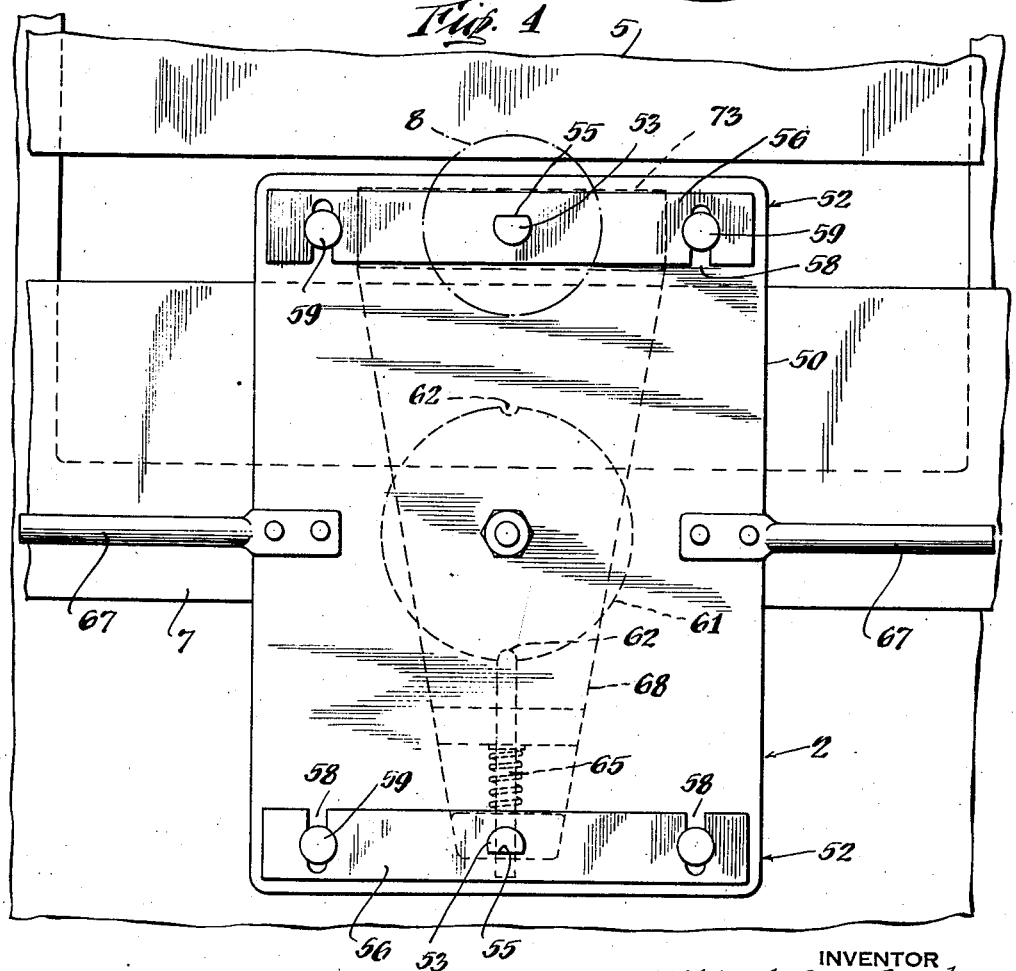

Patented May 11, 1943

2,318,977

UNITED STATES PATENT OFFICE 2,318,977

MACHINE FOR INLAYING

Milford Guy Sypher, Summit, N. J., assignor to Plastic Inlays, Inc., Summit, N. J., a corporation of New Jersey Application April 15, 1940, Serial No. 329,680

14 Claims. (Cl. 41—1)

The present invention relates to machines for inlaying ornaments and more particularly to a machine for inlaying metal ornaments into articles generally and particularly into articles molded from plastic materials.

During the past few years articles decorated by having ornaments of various sizes and shapes inlaid therein have enjoyed continual increase in popularity. The application of such ornaments to materials molded of synthetic resins, commonly called plastics, has greatly increased. Such articles are usually made in a solid color and contrasting metal inlays therein give a richer and more attractive appearance and add greatly to their ornamental qualities.

In view of the fact that such articles are sold at a low price in a highly competitive market, the cost of inlaying has to be kept as low as possible. The present invention aims to provide a simple and inexpensive machine adapted to inlay ornaments into articles at a rapid rate. The machine is particularly adapted for use in instances where the size, character or number of parts of the ornaments are such as to require substantial time in placing the ornaments or inlays into a recess. Several operators may work at a single machine for placing the inlays in the recesses and another operator may present the articles with the inlays in the recesses to a mechanically operated head for fixing the inlays in position. The invention contemplates provision of means for holding the articles to be inlaid, a pressure element adapted to tap ornaments into position and which may be heated to heat the inlay and the adjacent parts of the article during the inlaying operations. It will be understood that while the tapping and heating are very desirable in many instances either or both may be dispensed with in connection with the inlaying of articles where they are not needed.

An object of the present invention is to provide a relatively simple, inexpensive and improved inlaying machine.

Another object of the invention is to provide a machine for inlaying an ornament into an article by means of a series of taps.

Another object of the invention is to provide an inlaying machine which requires a minimum amount of skill or training on the part of an operator.

Another object of the invention is to provide an inlaying machine which is foolproof in operation.

Another object of the invention is to provide a machine for heating an ornament during inlaying thereof in an article.

Another object of the invention is to provide a machine adapted more rapidly to inlay ornaments into articles molded of plastic compositions.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a side elevational view, partly broken away, of the present machine;

Fig. 2 is a view taken along line 2—2 of Fig. 1;

Fig. 3 is an enlarged sectional view taken along line 3—3 of Fig. 2, but with the machine in position to inlay an ornament in an article;

Fig. 4 is an enlarged top plan view of an article-holding device;

Fig. 5 is a top plan view of an article which may be decorated by using the present machine; and Fig. 6 is a sectional view of the article illustrated in Fig. 5, but prior to inlaying of an ornament.

Figure 1:
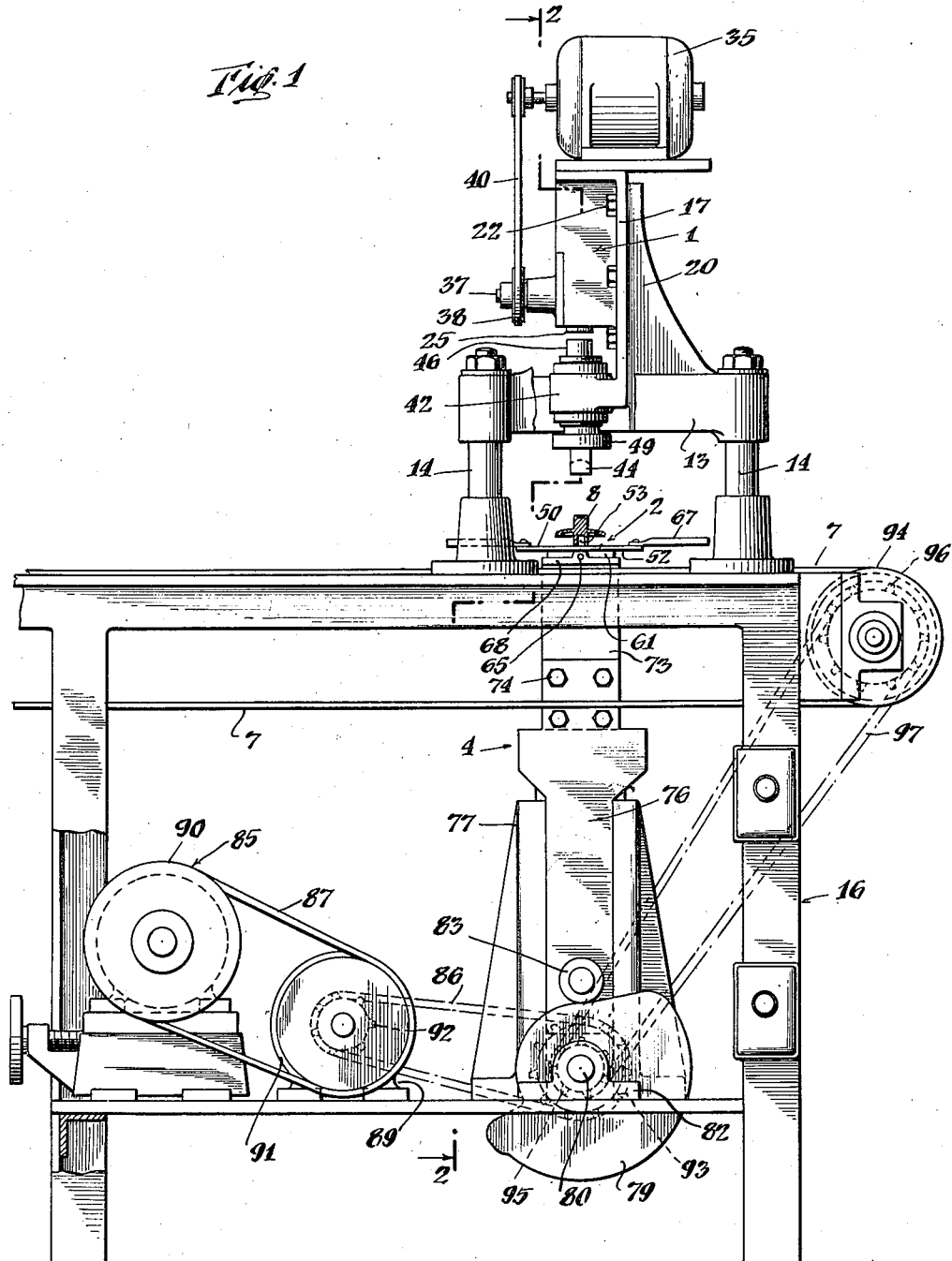

The present machine comprises generally a pressure head 1, an article supporting and positioning table 2 beneath the pressure head, a pillar 4 for moving the article supporting table 2 into inlaying position, conveyor belts 5 and 7 for moving articles to the article supporting table 2, and the driving means for the conveyors.

While various types of ornaments may be inlaid into articles of different shapes and kinds, for illustrative purposes the present machine will be described with reference to inlaying a metal ornament into a molded article 8 having a preformed ornament receiving recess 9 therein. For example, the article may be an oven door knob (Figs. 5 and 6) molded from a synthetic resin compound or some other plastic molding compound. The type of ornament preferably comprises a flat lower seating or guiding member 10 and a curved upper visible member 11. The lower flat member 10 is preferably first placed at the bottom of a preformed recess 9 in a member to be decorated and the curved, visible member 11 placed in the recess 9 on top of the flat member. Thereafter, pressure applied to the curved member substantially flattens it and causes its free edges to be guided outward by the flat lower member to facilitate digging into and locking with the sides of the recess 11 in the article to securely hold the ornament therein.

The pressure head 1 is preferably carried by cross bars 13 which connect with upright, spaced leg or column members 14 and this assembly is in turn mounted adjacent one end of a table-like framework 16 of angle irons or other suitable structural shapes.

The parts of the tapping or pressing head 1 are preferably carried by or comprise part of a plate member 17 having a plurality of substantially vertically disposed elongated slots 19 therethrough and which may be bolted, screwed or otherwise secured to an upright supporting extension 20 of one of the cross bars 13. The entire pressure head assembly may be adjusted in height by loosening clamping bolts 22 and shifting the head to a desired height. Adjacent the upper part of the plate member 17 is located, in upright position, a recessed or hollow casing 23 for receiving and guiding a longitudinally reciprocable hammer or tapper member 25. The tapper member 25 preferably has a recess 26 in one face thereof within which is secured a roller 28 adapted to cooperate with a cam 29 that projects into the recess 26. Rotation of the cam 29 within the recess 26 lifts the recessed tapper member 25 through the intermediation of the roller 28 on which the cam is effective and when the highest point of the cam has passed the roller, the tapper member is free to move downwardly until the roller comes into contact with a low point of the cam 29.

To increase the force with which the hammer 25 moves downwardly a spring 31 may be compressed against the upper surface of the hammer; when a high point on the cam has rotated past the hammer roller 28 the spring 31 forcibly urges the hammer downwardly to inlay an ornament, as will be hereinafter further described. The spring may be of the spiral type and an upwardly extending rod 32 at the upper part of the hammer is preferably utilized to assist in maintaining the spring in position. An adjusting screw 34 may be used to regulate the compression of the spring and hence the force or pressure with which the hammer 25 moves downwardly.

Rotation of the hammer actuating cam 29 is achieved by an electric motor 35 through the intermediation of a shaft 37 secured adjacent one end thereof to the cam 29, a pulley wheel 38 adjacent the other end of the cam shaft 37, and a connecting belt 40. During inlaying operations the above described tapping means preferably operates continuously. It is capable of generating about 1800 taps per minute, approximately 60 to 75 taps usually being sufficient to set an ornament into an ordinary plastic article.

Generally it is desired to hold an ornament in position against an article both prior to and during the actual tapping operation. If the tapping hammer 25 were caused to act directly upon an ornament and article there would be present the likelihood of the ornament moving at least slightly from the desired position. To minimize undesirable movement of an ornament and article means is therefore provided to hold them in position prior to the above described tapping means becoming effective.

A hollow sleeve 41 secured to a bracket 42 or the like on the plate member 17 carries a reciprocable plunger 43 having a lower ornament and article contacting head 44 at one end thereof and an upper hammer contacting head 46 adjacent the opposite end thereof. A spring 47 located within the hollow sleeve 41 and extending about the plunger 43 normally maintains the plunger in downward position. When the plunger is moved upwardly it comes into contact with the tapper hammer 25 to transmit blows or impacts to the lower ornament and article contacting head 44. In normal downward position of the plunger 44 the upper plunger head 46 is spaced from the tapper hammer 25 and the latter is ineffective upon it. An article to be inlaid is moved upwardly until it contacts the lower head 44 of the holding plunger 43 and moves this plunger upwardly in opposition to the plunger spring 47; the upper head 46 thereupon comes into contact with the tapper hammer 25. At the time the tapper hammer 25 becomes effective the ornament and article are firmly held in position.

The lower plunger head 44 is preferably heated electrically by a heating unit 49 of any suitable type carried adjacent the lower portion of the plunger. The temperature of the lower plunger head 44 may be automatically controlled by a thermostat (not shown). Heat from the lower plunger head is communicated to the ornament to be inlaid, which quickly assumes the temperature of the plunger head. From the ornament the heat is communicated to the plastic article itself, to effect a localized softening of the article. Also, the lower plunger head 44 should be shaped to conform generally to the surface of the article being decorated.

The article to be decorated, with an ornament preliminarily placed in a recess 9 thereof, is placed in position on a suitable holder 52 by an operator and the holder 52 and article moved upwardly, as above mentioned, into contact with the reciprocable plunger 43. The reciprocable plunger transmits impacts or taps from the tapper hammer 25 to the ornament article.

The article holding and positioning table 2 preferably comprises a rotatably mounted base member 50 having an article holder 52 adjacent each end thereof; the holders 52 may be of any suitable type, depending upon the particular article to be held. In the present instance they comprise upwardly extending plugs 53 over which an article (Figs. 5 and 6) may fit. A flat side 55 on the plugs prevents accidental movement of a knob. Adjustment or spacing of the plugs 53 is facilitated by mounting them on adjusting plates 56 provided with slots 58 through which project clamping bolts 59 which are screwed into the base member 50; accurate registry of an article with the tapping or pressing head 44 may thus be obtained.

Rotatable mounting of the base member 50 allows a completed inlaid article to be swung out of inlaying position and another unfinished article to be swung into inlaying position. Inlaying operations are greatly speeded up by this construction. A plate 61 attached to the underside of the base 50 has a pair of recesses 62 therein which cooperate with a spring-actuated detent member 65 to indicate when a work holder 52 is in correct tapping or pressing position and which lock it in this position during the inlaying operation. Handle members 67 attached to the base 50 facilitate rotation of it and presentation of articles to the tapping means.

The entire assembly of table 2, article holders 52 and table locking means 65 may be mounted on an outwardly extending arm 68 of an upright, vertically movable pillar 4 positioned beneath and substantially in line with the pressing head 1. In inlaying position one end of the table 2, one of the work holders 52 and the article thereon, extend over the end of the pillar 4, the upper end 71 of which forms a support or anvil for the base member 50. Upward movement of the pillar 4 lifts the entire table assembly 2 and brings a work holder 52 and article thereon into a position where the lower head 46 of the reciprocable plunger 43 is effective to inlay an ornament into the article. Lowering of the pillar 4 and anvil 71 moves the table 2 and an article thereon away from the tapping head 1 so that the table may be rotated to present another article in line with the anvil 71 and pressing head 1. Preferably the pillar 4 is made in two parts, with the upper part 73 secured by bolts 74 or the like to the lower part 76. This construction facilitates interchanging of table assemblies for different types of work.

Upward and downward movement of the pillar 4 is directed by a recessed guide member 77 with which an extension 78 of the pillar 4 cooperates. Vertical movement of the pillar may be achieved by a rotatable cam 79 secured to a shaft 80 mounted in bearings 82 attached to the supporting table or framework 16 adjacent the lower part of the pillar; the cam 79 cooperates with a roller 83 on the pillar to lift and lower it. The cam and its shaft may be rotated by an electric motor 85 through the intermediation of drive belts or chains 86 and 87, a speed reducing means 89 and sprockets or pulley wheels 90, 91, 92 and 93.

For conveying articles to the table assembly there is utilized a pair of substantially parallel, endless belt conveyors 5 and 7, positioned one on each side of the pillar 4 which supports the table assembly. The two spaced belts permit uninterrupted movement of the pillar and table assembly and are adapted to convey articles at a desired rate to the article holders 52 on the rotatable table. The ends of the conveyor belts pass over pairs of spaced pulleys 94, the driving pair of which is shown in Figs. 1 and 2. The pair of driving pulleys 94 is rotated through sprockets or pulley wheels 95 and 96 and a belt 97 by the same motor 85 which actuates the pillar 4.

It is believed that the operation of the machine will be clear from the foregoing detailed description of the parts but for convenience it will be briefly set forth again. Articles 8 having ornaments preliminarily placed in a recess 9 thereof move along with the conveyor belts 5 and 7 to a position adjacent the table assembly 2, at which point they are placed by an operator upon the article holders 52 of the table assembly. The article holders 52 may thereupon be selectively moved into operative position with respect to the pressure head 1. After an article has been acted upon by the pressure head 1 to inlay an ornament in the article, the rotatable table assembly 2 may be actuated by a handle 67 to carry the inlaid article into a position where the article may be conveniently removed from its holder; as an article is being moved away from operative position with respect to the pressure head 1 another article holder on the table assembly is being simultaneously moved into operative position. The pillar 4 moves upwardly, due to rotation of the lower cam 79, to bring an article 8 into contact with the lower plunger head 44; the lower plunger head 44 holds the ornament and article firmly on a holder 52. The lower plunger head 44 may or may not be heated by a heating unit 49, whichever is desired. Further upward movement of the pillar 4 brings the upper plunger head 46 into contact with the continuously operating hammer member 25 which transmits impacts or taps through the plunger 43 to inlay the ornament in the article.

While preformed recesses 9 are preferred in a molded article and the present machine has been described chiefly with reference to such articles, it will be clear that the present machine is equally adapted to the inlaying of ornaments into articles having smooth surfaces.

It will be seen that the present invention provides a new and improved, relatively inexpensive and simple inlaying machine. The machine performs inlaying operations by a series of impacts or taps and greatly facilitates the embedding operation while simultaneously minimizing cracking or breaking off of pieces of material. To further improve inlaying, means is provided adapted to locally heat an ornament and article. The machine is rugged in construction and well able to withstand the rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A machine of the class described for inlaying ornaments comprising, in combination, means adapted to create a series of taps, means adapted to be actuated in response to movement of an article to transfer taps from said tap creating means to an ornament to be attached to an article, and an article holder adapted to be moved to present an article to said tap transferring means so as to tap an ornament into position in said article.

2. A machine of the class described for inlaying ornaments comprising, in combination, reciprocable pressure means, normally inoperative reciprocable means intermediate said pressure means and an article holder adapted to be actuated to transfer pressure from said pressure means to an ornament to be attached to an article to be ornamented, and an article holder adapted to be moved to present an article to said pressure transferring means so as to press an ornament into position in said article.

3. A machine of the class described for inlaying ornaments comprising, in combination, means adapted to create a series of taps, means for transferring taps from said tap creating means to an article to be ornamented, heating means carried by said transferring means for heating a portion of said transferring means, and an article holder adapted to be moved to present an article to said tap transferring means and move the latter into operative relation with said tap creating means to effect heating and tapping of an ornament into said article.

4. In a machine of the class described, a tapping head comprising, in combination, a reciprocable member, cam means for actuating said member, an electric motor for driving said cam means, a hammer member adjacent to said reciprocable member, and resilient means normally maintaining said hammer member out of contact with the reciprocable member, said hammer member being adapted to be moved into contact with the reciprocable member so as to receive taps from said reciprocable member and tap an ornament into position in an article.

5. A tapping means for securing ornaments in articles comprising, in combination, a reciprocable member, cam means for actuating said member, means for rotating said cam means, a hammer member adjacent to said reciprocable member and normally maintained out of contact with the reciprocable member, said hammer member being adapted to be moved into contact with the reciprocable member so as to receive taps from said reciprocable member and tap an ornament into position in an article.

6. A tapping means for securing ornaments in articles comprising, in combination, means for generating a series of impacts, hammer means normally out of contact with said impact generating means but adapted to be moved into contact therewith so as to tap an ornament or the like into an article, and means adapted to heat said hammer means to facilitate tapping said ornament or the like into said article.

7. A machine of the class described, comprising, in combination, continuously operable impact generating means, means adapted to be independently and intermittently actuated to transfer a series of impacts from said impact generating means to an article to be ornamented, and intermittently actuated means adapted to move said impact transferring means into contact with said impact generating means.

8. A machine of the class described, comprising, in combination, continuously operable reciprocating impact generating means, a second reciprocable means spaced from said impact generating means adapted to be moved into contact therewith to transfer impacts from said continuously operable reciprocating means to an article to be ornamented, and intermittently actuated article supporting means adapted to move said impact transferring means into contact with the impact generating means, whereby an ornament may be inlaid in an article on the supporting means.

9. A machine of the class described, comprising, in combination, continuously operable impact generating means, means adapted to be intermittently actuated to transfer impacts from said impact generating means to an article to be ornamented, means for holding an article to be ornamented, a movable supporting anvil normally positioned beneath said article holding means and beneath said impact transferring means, and a cam effective to intermittently actuate said anvil and article holding means so as to present an article to said impact transferring means.

10. A machine of the class described including, in combination, means for pressing an ornament into an article, a plurality of article holders adapted to selectively present articles to said ornament pressing means, a table pivotally mounted at its center for carrying said article holders, and an anvil beneath said table for supporting it adjacent one side thereof and for supporting an article holder on the table while presented to the ornament pressing means, said anvil having an extension thereon adapted to rotatably mount said table.

11. In a machine of the class described, in combination, means for selectively presenting articles to be inlaid to a pressing member, said means comprising a table having a plurality of article holders thereon, means for moving said article holders into and out of effective position with respect to said pressing member and a supporting anvil, and an anvil located beneath one side of said table and in alignment with said pressing member adapted to support the side of the table and said article holder thereon when an article is being inlaid by the pressing member.

12. A machine of the class described including, in combination, a table having a plurality of article holders adapted to be selectively presented to an ornament pressing means, means for moving said article holders so as to selectively present them to said pressing means, an anvil positioned beneath said ornament pressing means adapted to support an article holder while presented to the ornament pressing means, said anvil having a lateral extension at its upper end, means for pivotally mounting the table on the extension and a cam for moving said anvil and the table into effective position with respect to said ornament pressing means to inlay an ornament in an article on a holder.

13. A machine of the class described including, in combination, a table member having means for adjustably retaining a plurality of article holders, a plurality of adjustable article holders carried by said retaining means and an anvil having a lateral extension for pivotally supporting said table member to facilitate selective presentation of said article holders to an ornament pressing means, said anvil being adapted to underlie and support said table and an article holder when presented to the ornament pressing means.

14. In a machine of the class described, a table assembly adapted to support articles to be inlaid comprising, in combination, an article holder, means supporting said article holder having a recess therein adapted to receive a member for clamping said supporting means in desired position, a movable base maintaining said supporting means in position and adapted to be moved so as to present said article holder and an article thereon to an ornament pressing means and a clamping member mounted on said movable base with a portion extending into said recess on the supporting means to normally retain said article supporting means in desired position.

MILFORD GUY SYPHER.

CERTIFICATE OF CORRECTION.

Patent No. 2,318,977. May 11, 1943.

MILFORD GUY SYPHER.

It is hereby certified that error appears in the above numbered patent requiring correction as follows: In the heading to the drawings, Sheets 1, 2 and 3, name of inventor, for "W. G. SYPHER" read --M. G. SYPHER--; and that the said Letters Patent should be read with this correction therein that the same may conform to the record of the case in the Patent Office.

Signed and sealed this 22nd day of June, A. D. 1943.

(Seal)

Henry Van Arsdale,
Acting Commissioner of Patents.